Patented Sept. 20, 1927.

1,642,896

UNITED STATES PATENT OFFICE.

FRITZ SANDER, OF GRIESHEIM-ON-THE-MAIN, GERMANY, ASSIGNOR TO I. G. FARBEN-INDUSTRIE AKTIENGESELLSCHAFT, OF FRANKFORT A. M., GERMANY.

MANUFACTURE OF FLUORIDES.

No Drawing. Application filed June 8, 1925, Serial No. 35,816, and in Germany June 10, 1924.

This invention refers broadly to the manufacture of fluorides, and in particular to the preparation of soluble fluorides, and it is intended to devise means of avoiding the very annoying evolution of hydrofluoric acid and other inconveniences heretofore met with in the manufacture of the products referred to. In the manufacture of soluble fluorides, as heretofore practiced it was usual to liberate hydrofluoric acid from fluorspar by means of sulphuric acid, and then to obtain the corresponding fluorides of alkali from the hydrofluoric acid by means of common salt, or by combination with potash or ammonia. A satisfactory manufacture of these hydrofluoric salts from fluorspar without previous manufacture of free hydrofluoric acid has not been disclosed heretofore.

Now, in accordance with the process hereinafter described it is possible to dispense with the liberation of hydrofluoric acid and thereby to realize the important advantage that the very unhealthy manipulation of this acid and the necessity of using lead containers which are exclusively used in industrial processes of working with hydrofluoric acid are avoided. The process according to my invention may be considered as being carried out in two stages, as follows:—

(1) The first step is the manufacture of a difficultly soluble silicofluoride of an alkali or alkaline earth metal by treating fluorspar, in the presence of silicic acid and a difficultly soluble fluoride, with a dilute acid adapted to form a soluble calcium salt, for instance according to the following formula:—

(a) $\boxed{BaF_2 + Si(OH)_4} + 2CaF_2 + 4HCl = BaSiF_6 + 2CaCl_2 + 4H_2O$.

(a') $\boxed{2NaF + Si(OH)_4} + 2CaF_2 + 4HCl = Na_2SiF_6 + 2CaCl_2 + 4H_2O$.

The silico-fluoride is separated from the calcium salt solution by filtering off.

(2) The second step is to decompose in the well known manner, the difficultly soluble silicofluoride obtained by means of a solution of ammonia or an alkali forming an easily soluble fluoride according for instance to the following formula:—

(b) $BaSiF_6 + 4NH_4OH = \boxed{BaF_2 Si(OH)_4} + 4NH_4F$ (b') $Na_2SiF_6 + 4NH_4OH = \boxed{2NaF + Si(OH)_4} + 4NH_4F$.

The products of the second step are a solution of the desired fluoride, for instance ammonium fluoride, and a residue substantially consisting of the difficultly soluble fluoride and silicic acid that formed one part of the starting-materials in the first step of the process. For better comprehension I have enclosed these substances in a rectangle in both formulæ (a) and (b). It will be seen that the residue from the second step of the process may be utilized, besides new quantities of fluorspar and acid, for a second and any following operation.

The difficultly soluble fluoride may first be obtained in any manner, for instance by dissolving baryta or sodium carbonate in hydrofluoric acid, or by mixing solutions of ammonium fluoride and barium chloride and filtering off the precipitate formed.

It may further be seen from the above formulæ that all the fluorine is united in the products of the first step in the form of difficulty soluble silicofluoride which can easily be separated from the soluble products; whereas in the second step of the process the desired soluble fluoride is obtained besides insoluble or difficultly soluble products among which is the fluoride originally employed, so that the desired soluble fluoride can easily be separated from the latter. If, however, I would start from a soluble fluoride, for instance potassium fluoride which also forms an insoluble silicofluoride, I would obtain in the second step a mixed solution of two fluorides which can only be separated with difficulty from each other and therefore are worthless, whereas, by my process I may obtain, for instance, from barium silicofluoride by means of ammonia, pure ammonium fluoride and by means of potassium carbonate, pure potassium fluoride.

*Example.*

1. 150 kgs. of ground fluorspar and the residue of a foregoing charge (consisting of $BaF_2$ and $Si(OH)_4$) is boiled during one or two hours with about 1000 kgs. of a 20 per cent. hydrochloric acid in a reflux condenser. The product is filtered off and washed out. The filtrate contains at least 85 per cent of the calcium, which was contained in the fluorspar, dissolved in the form of calcium chloride $CaCl_2$, besides the excess of hydrochloric acid and small quantities of calcium fluoride and silicofluoride. The solid reaction product ($BaSiF_6$) is heated with about 200 kgs. of a 25 per cent ammonia water, the solution is filtered off, and the residue washed out with water. This residue consists of hydrated silicic acid, barium fluoride and some undecomposed fluorspar and is used for a second operation.

The filtrate contains about 85 per cent of the fluorine, that was originally contained in the fluorspar, dissolved in the form of substantially pure ammonium fluoride. It may be transformed in the well known manner to sodium fluoride NaF by means of common salt, or it may be employed for making fluorine compounds.

2. 150 kgs. of ground fluorspar and the residue of the foregoing charge $$(BaF_2 + Si(OH)_4)$$

are boiled during one or two hours with about 570 kgs. of a 60 per cent. nitric acid in a reflux condenser. The product is filtered off and washed out. The filtrate contains at least 80 per cent of the calcium, which was contained in the fluorspar employed, dissolved in the form of $Ca(NO_3)_2$, besides the excess of nitric acid and small quantities of calcium fluoride and silicofluoride. The solid reaction product ($BaSiF_6$) is heated with about 200 kgs. of a 25 per cent. ammonia water, the solution is filtered off and the residue washed out with water. This residue consists of hydrated silicic acid, barium fluoride and some undecomposed fluorspar and is used for a second operation.

The filtrate contains about 75 per cent of the fluorine, that was originally contained in the fluorspar, dissolved in the form of substantially pure ammonium fluoride. It may be transformed in the well known manner to sodium fluoride NaF by means of common salt, or it may be employed for making fluorine compounds.

By utilizing the residue which contains all the fluorspar that might have escaped the extraction in a subsequent operation the fluorine output is rendered nearly perfect.

I claim:—

1. The process of manufacturing hydrofluoric salts which consists in heating, silicic acid, fluorspar and barium fluoride with hydrochloric acid, filtering off the difficultly soluble silicofluoride formed, decomposing the latter with ammonia water, and filtering off the solution of the ammonium fluoride formed.

2. The process of manufacturing fluorides, which consists in heating silicic acid, fluorspar and a difficultly soluble alkali forming metal fluoride, which combines with silica to form a difficultly soluble silicofluoride, with a strong mineral acid capable of forming soluble calcium salts, filtering off the difficultly soluble silicofluoride formed, decomposing the latter with an alkaline compound the cation of which forms an easily soluble fluoride and filtering off the solution of the soluble fluoride formed.

3. The process of manufacturing fluorides which consists in heating the residue left by decomposing the silicofluoride according to claim 1 and mainly consisting of silicic acid and a difficultly soluble fluoride, with fluorspar and strong mineral acid capable of forming soluble calcium salts, filtering off the difficultly soluble silicofluoride formed, decomposing the latter with an alkaline compound the cation of which forms an easily soluble fluoride and filtering off the solution of the soluble fluoride formed.

In testimony whereof I affix my signature.

FRITZ SANDER.